(12) United States Patent
Hansel et al.

(10) Patent No.: US 8,239,390 B2
(45) Date of Patent: Aug. 7, 2012

(54) FILTERED REMOTE JOURNAL

(75) Inventors: Bruce W. Hansel, Rochester, MN (US); Margaret E. Levering, Rochester, MN (US); Chad A. Olstad, Rochester, MN (US); David F. Owen, Rochester, MN (US); Donald F. Zimmerman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/713,821

(22) Filed: Feb. 26, 2010

(65) Prior Publication Data

US 2011/0213781 A1    Sep. 1, 2011

(51) Int. Cl.
*G06F 7/00* (2006.01)
*G06F 17/30* (2006.01)
(52) U.S. Cl. .................... 707/741; 707/715; 707/754
(58) Field of Classification Search .................... None
See application file for complete search history.

(56) References Cited

U.S. PATENT DOCUMENTS

| 7,593,954 | B1* | 9/2009 | Lloyd et al. | 1/1 |
| 7,801,864 | B2* | 9/2010 | Prahlad et al. | 707/667 |
| 7,831,622 | B2* | 11/2010 | Prahlad et al. | 707/791 |
| 7,849,059 | B2* | 12/2010 | Prahlad et al. | 707/648 |
| 7,930,271 | B2* | 4/2011 | Tarbell | 707/615 |
| 2009/0300042 | A1* | 12/2009 | Lloyd et al. | 707/101 |
| 2010/0070542 | A1* | 3/2010 | Feinsmith | 707/812 |

* cited by examiner

*Primary Examiner* — Khanh Pham
*Assistant Examiner* — Azam Cheema
(74) *Attorney, Agent, or Firm* — Martin & Associates, LLC; Derek P. Martin (57) ABSTRACT

An operating system on a source computer system includes a filtered remote journal mechanism that generates a target map of a remote journal to specify where in the remote journal entries will be stored, then generates a vector array that represents the data of interest in the database journal based on specified selection criteria and the target map. The vector array and location information from the target map is then sent to a communication manager, which sends the data indicated in the vector array to the target computer system. On the target computer system, the communication manager reads the data sent from the source computer system and writes the data to the remote journal. The filtered remote journal mechanism may operate on an existing database journal, or may operate iteratively as journal entries are written on the source computer system.

19 Claims, 7 Drawing Sheets

FILTERED REMOTE JOURNAL

BACKGROUND

1. Technical Field

This disclosure generally relates to computer systems, and more specifically relates to journaling in database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Database systems typically include a database manager that assures the integrity of the database as changes to the database are made. The database manager typically records changes to a database in a journal. The journal allows changes to the database to be rolled back, if needed. In addition, a journal may be used to replicate a database by applying the journaled changes to a remote database in the same order the journaled changes were made to the original database.

One known method for data replication transmits all journal entries from a source computer system to a target computer system. The journal entries are placed into a remote journal in the target computer system, which is typically read-only. The remote journal may then be used to replicate the database in the source computer system by applying the changes in the remote journal to the database in the target computer system. The remote journal on the target computer system is an exact duplicate of the journal on the source computer system. This approach assures all changes to the database on the source computer system are reflected in the replicated database in the target computer system.

There are circumstances where data in the source computer system needs to be accessed in a target computer system, but complete replication of the database would be very inefficient due to the relatively small amount of data of interest. One known approach in the prior art uses application software to read log entries, transmit the log entries of interest to a target computer system, write those log entries on the target computer system, and apply those log entries to the database in the target computer system. The problem with this approach is that none of the control or security features of the operating system are used. In addition, the remote log in this scenario is not read-only to the applications on the target computer system, which means local applications on the target computer system may also write to the log. This results in entries in the remote log that cannot be easily reconciled to the source computer system database because the sequence numbers may be different. As a result, there must be substantial intelligence in the application software to keep track of which entries in the remote log in the target computer system correspond to which log entries in the source computer system. Without a way to easily replicate a part of a database that is of interest in a way that is secure and has minimal overhead, the database industry will continue to suffer from inefficiencies in replicating a portion of a database between a source computer system and a target computer system.

BRIEF SUMMARY

An operating system on a source computer system includes a filtered remote journal mechanism that generates a target map of a remote journal to specify where in the remote journal entries will be stored, then generates a vector array that represents the data of interest in the database journal based on specified selection criteria and the target map. The vector array and location information from the target map is then sent to a communication manager, which sends the data indicated in the vector array to the target computer system. On the target computer system, the communication manager reads the data sent from the source computer system and writes the data to the remote journal. The filtered remote journal mechanism may operate on an existing database journal, or may operate iteratively as journal entries are written on the source computer system.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a way to filter journal entries on a source computer system according to one or more selection criteria, and to send the filtered journal entries to a target computer system. The filtering is performed by the operating system, thereby providing all the security and controls inherent in operating system code. In addition, the target computer system may not know or care it is receiving filtered journal entries. When the filtered journal entries are received by the target computer system, they are written to the remote journal. In this manner, there is preferably no special software required on the target computer system to process the filtered journal entries. The filtered journal entries may be processed in similar manner as non-filtered journal entries. As a result, the filtering of journal entries on the source computer system may not require any changes in the target computer system.

Figure 2:
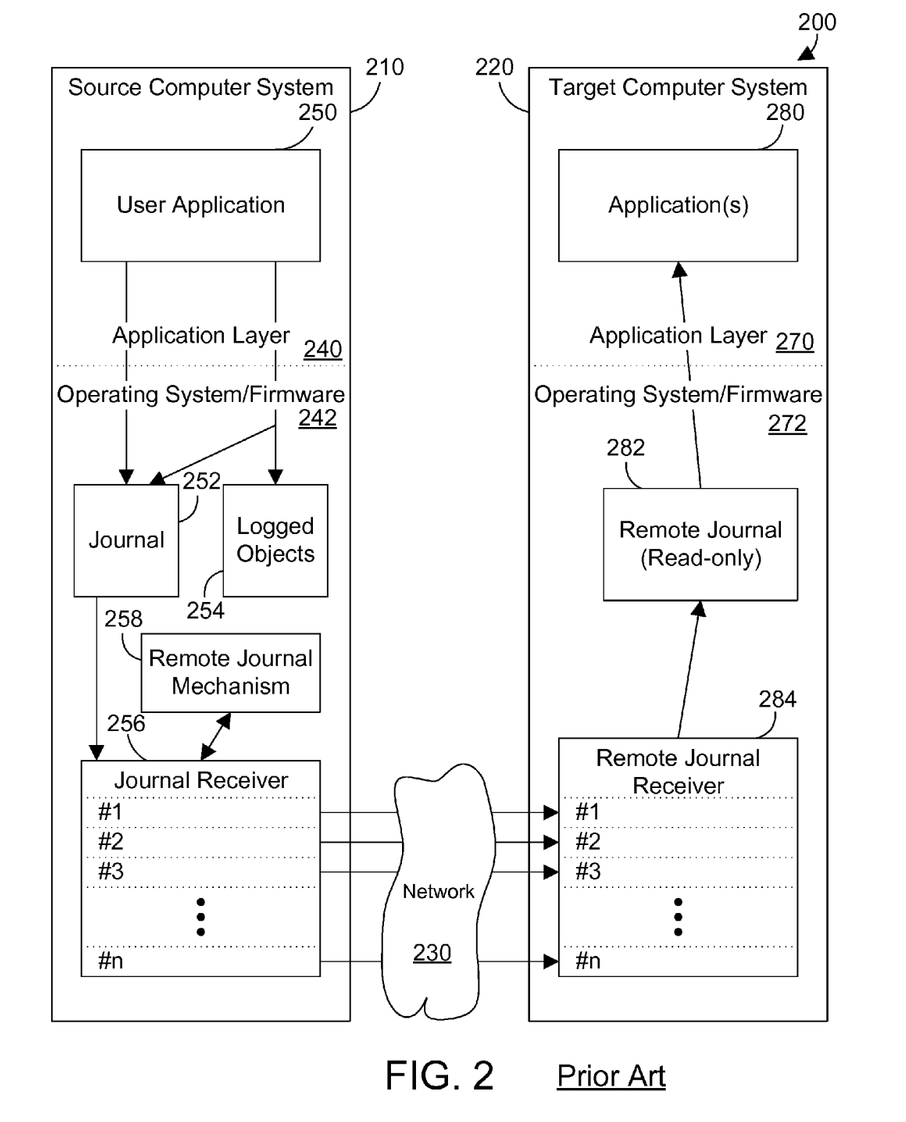
FIG. 2 is a block diagram of a prior art system for complete replication of journal entries between a source computer system and a target computer system.

To provide a background that will help to understand the disclosure and claims herein, we first discuss prior art implementations for sending journal entries from a source computer system to a target computer system. Referring to FIG. 2, a distributed computer system 200 includes a source computer system 210 and a target computer system 220 coupled together via a network 230. The specific example shown in FIG. 2 is for a replicated database, where all journal entries in the source computer system 210 are transmitted to the target computer system 220. The source computer system 210 is shown divided into two different layers, an application layer 240 and an operating system/firmware layer 242. The application layer 240 is where application programs such as a user application 250 runs. The operating system/firmware layer 242 is where protected operating system code is run. The difference between an application layer 240 and an operating system/firmware layer 242 is well-known in the art, and is not discussed in further detail herein.

The operating system/firmware layer 242 includes a journal 252 that is used to log changes to a database that includes logged objects 254. The user application 250 may make changes to logged objects 254, which are recorded in the journal 252, or may send entries directly to the journal 252. The journal 252 stores the changes as a series of entries in a journal receiver 256. Each entry in the journal receiver 256 represents a change to a logged object 254. A remote journal mechanism 258 causes each and every entry in the journal receiver 256 to be transmitted to the target computer system 220.

The target computer system 220 is also divided into an application layer 270 and operating system/firmware 272. One or more applications 280 run in the application layer. Examples of applications 280 that may run on the target computer system include object replication applications, auditing applications, and user applications. The operating system/firmware layer 272 of the target computer system includes a remote journal 282 and a remote journal receiver 284. The remote journal receiver 284 stores entries received via network 230 from the journal receiver 256 in the source computer system. The journal entries in the remote journal receiver 284 are read by the remote journal 282, which is read-only to prevent any applications 280 from changing the data in the remote journal 282. The applications 280 may read journal information from the remote journal 282. The journal receiver 256 in the source computer system 210 and the remote journal receiver 284 in the target computer system are identical with the exception of the time it takes to propagate a new entry from the journal receiver 256 to the remote journal receiver 284. In this manner, the journal entries in journal receiver 256 are sent via network 230 to the remote journal receiver 284 in the target computer system, which allows for complete replication of the logged objects 254 on the target computer system 220.

FIG. 2 indicates the copying of entries from the journal receiver 256 to the remote journal receiver 284 via network 230. This is shown in FIG. 2 to illustrate that each and every entry in journal receiver 256 will be written to journal receiver 284. One skilled in the art will recognize these entries are not written by the journal receiver 256 to the network 230. There is a communication manager (not shown in FIG. 2) in computer system 210 that sends each entry from journal receiver 256 to a corresponding communication manager (not shown in FIG. 2) in computer system 220. The lines between journal receiver 256 and remote journal receiver 284 via network 230 are shown to conceptually illustrate the copying of all journal entries from the source computer system 210 to the target computer system 220, and do not imply any specific architecture or mechanism for performing the copying.

Figure 3:
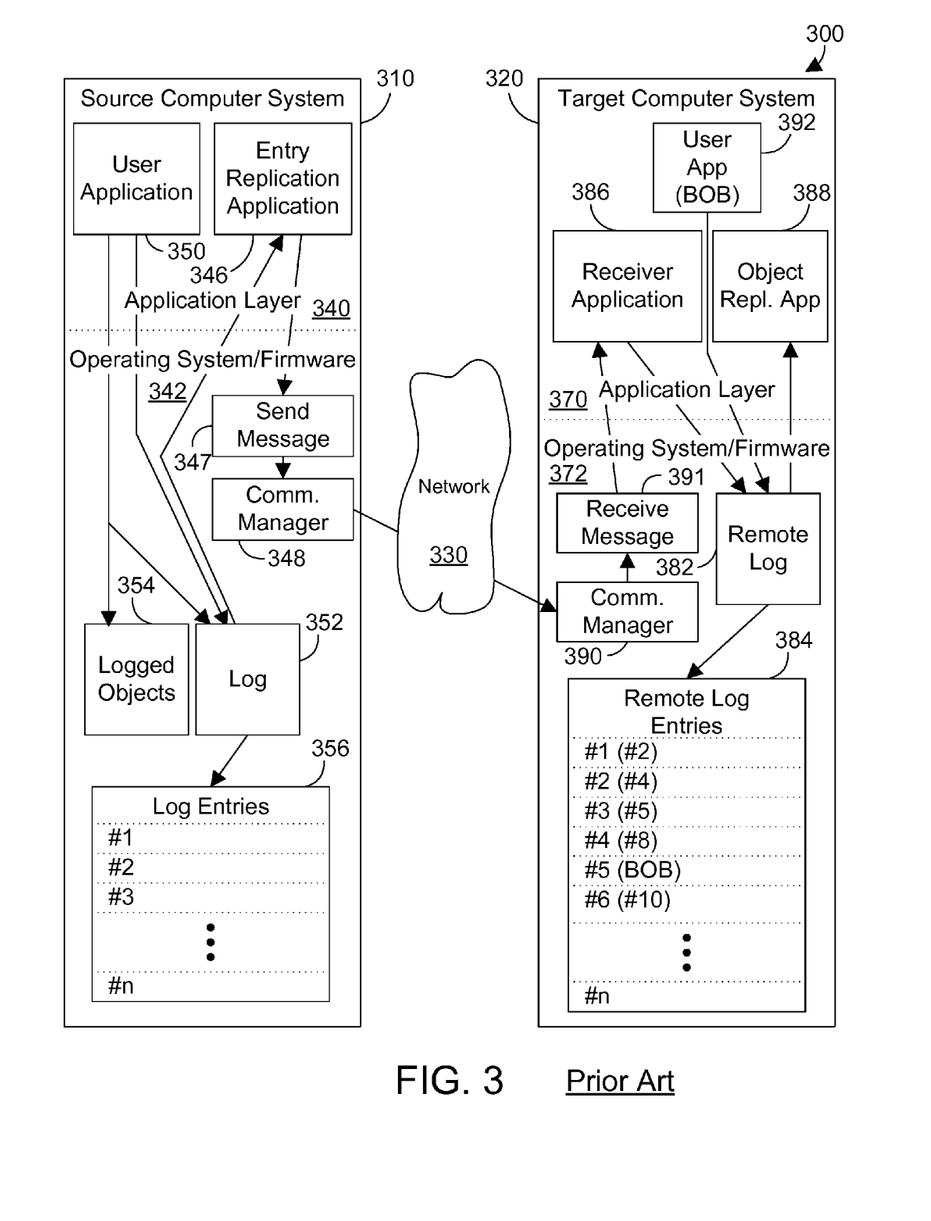
FIG. 3 is a block diagram of a prior art system for partial replication of log entries between a source computer system and a target computer system.

While complete replication by sending all journal entries is valuable, in many circumstances complete replication is not needed. Performing complete replication of a journal receiver when only a small portion of the data in the journal receiver is needed unnecessarily wastes system resources, is inefficient, and consumes significant network bandwidth. As a result, a different approach allows filtering which entries are sent to the target computer system. A prior art computer system 300 is shown in FIG. 3 that filters information sent from log entries 356 in the source computer system 310 to the target computer system 320 via network 330. The configuration in FIG. 3 is often referred to as a "scrape-and-send" approach. Information is read or "scraped" from the log entries 356, and sent in a message to the target computer system 320. The source computer system 310 preferably includes in the application layer 340 one or more user applications 350 and an entry replication application 346. In the operating system/firmware layer 342 there is a log 352 with corresponding log entries 356, logged objects 354, a send message mechanism 347, and a communication manager 348. The target computer system 320 preferably includes in the application layer 370 one or more user applications 392, a receiver application 386, and an object replication application 388. In the operating system/firmware layer 372 there is a remote log 382 with corresponding log entries 384, a communication manager 390 and a receive message mechanism 391.

The entry replication application 346 in the application layer 340 of the source computer system 310 is used to filter the contents of the log 352, and to send a subset of the log to the target computer system 320. The entry replication application 346 preferably reads data from the log 352, which includes the log entries 356. The entry replication application 346 may then apply a filtering criteria to select some subset of the log entries 356 to send to the target computer system 320. We assume for this specific example the filtering criteria selects entries 2, 4, 5, 8 and 10 in the log entries 356 for transmission to the target computer system 320. These entries are read from the log 352 by the entry replication application 346, and are then passed to the send message mechanism 347. Send message mechanism 347 is a suitable data transfer mechanism within the operating system, such as File Transfer Protocol (FTP), sndnetf (send network file), send message, or some other file or data transfer facility in the operating system. The send message mechanism 347 sends a message to the communication manager 348 for transmission to the communication manager 390 in the target computer system via network 330. The communication managers 348 and 390 are preferably low-level software in the network interface (150 in FIG. 1) that implements a network protocol, such as Transmission Control Protocol/Internet Protocol (TCP/IP). The communication manager 390 in the target computer system sends the log entries to the receive message mechanism 391, which sends the log entries to the receiver application 386, which then writes the log entries to the remote log 382. Because the receiver application 386 writes entries to the remote log 382, the remote log 382 cannot be read-only to applications in the application layer 370 as in the prior art system 200 shown in FIG. 2. As a result, the receiver application 386 will not be the only application that can write to the remote log 382. For example, a user application 392 run by a user named Bob can also make changes that will result in an entry on the remote log 382. This is shown in the remote log entries 384. We see the first entry #1 in the remote log entries 384 has entry #2 from the log entries 356 in the source computer system. In similar fashion, log entry #2 in the remote log entries 384 has entry #4 from the log entries 356; log entry #3 in the remote log entries 384 has entry #5 from the log entries 356; log entry #4 in the remote log entries 384 has entry #8 from the log entries 356; log entry #5 in the remote log entries 384 has an entry from the user application 392 being run by Bob; and log entry #6 in the remote log entries 384 has entry #10 from the log entries 356. Note how the remote log entries 384 do not correspond to the entries of the same number in the log entries 356. This requires significant overhead in the receiver application 386 to keep track of which log entries in the remote log entries 384 correspond to which log entries 356 in the source computer system. In addition, because the remote log 382 can be written to by applications, and because the receiver application 386 is in the application layer 370, this method of filtering journal entries is not secure and does not take advantage of the built-in security and control features of the operating system/firmware layer 372. As a result, the implementation shown in FIG. 3 suffers from many drawbacks, which are solved by the system in the disclosure and claims herein.

Figure 1:
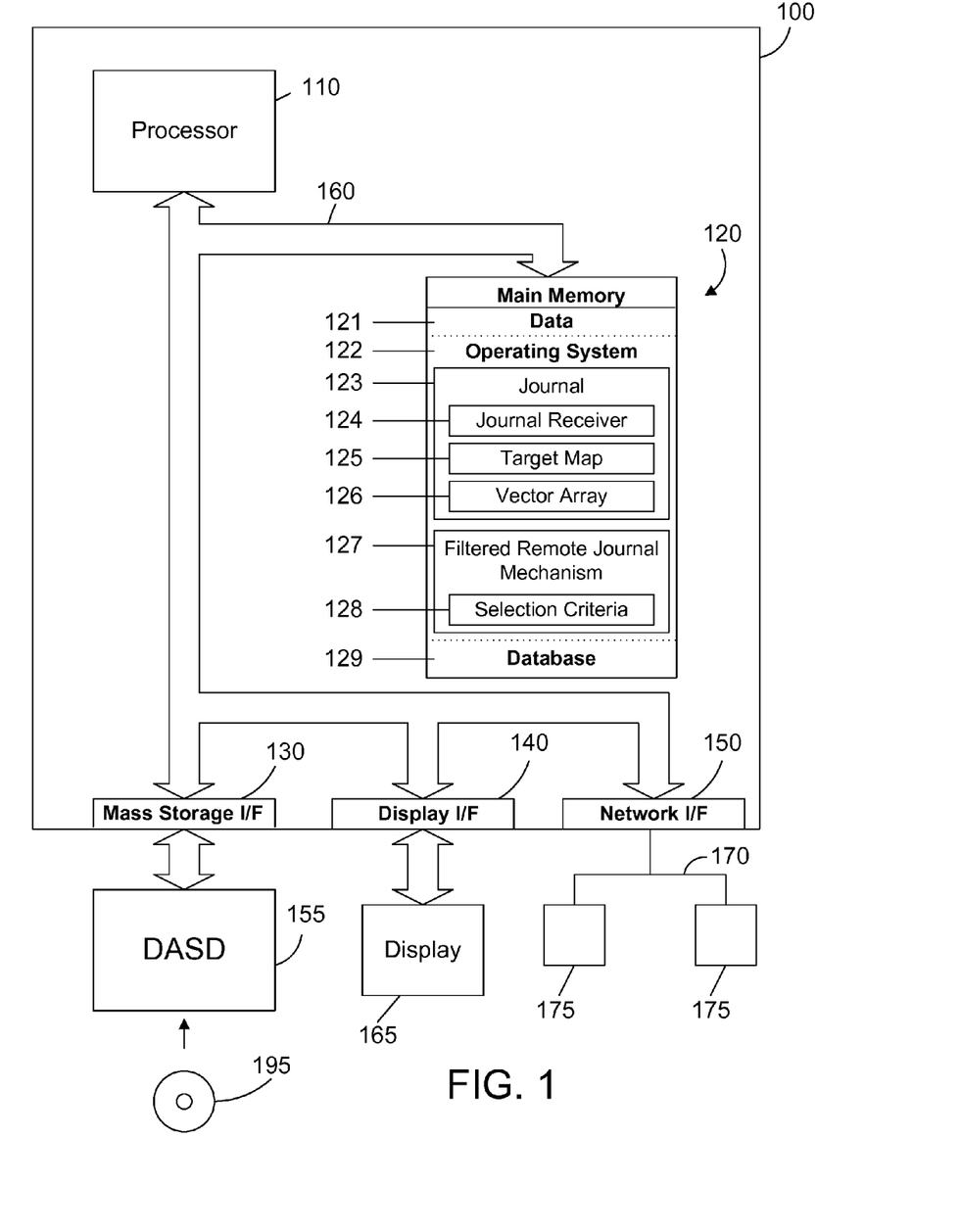
FIG. 1 is a block diagram of an apparatus that filters journal information and sends the filtered journal information to a target computer system.

Referring to FIG. 1, a computer system 100 is one suitable implementation of a computer system that sends filtered journal data to a target computer system. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, and a database 129. Data 121 represents any data that serves as input to or output from any program in computer system 100. Database 129 is any suitable database, whether currently known or developed in the future, and may include both relational databases and object databases. Operating system 122 is a multitasking operating system. Operating system 122 includes a database journal 123 and a filtered remote journal mechanism 127. The database journal 123 includes a journal receiver 124, a target map 125, and a vector array 126. The journal receiver 124 receives journal entries that each represent a change to the database 129. The target map 125 is a virtual map that is generated to represent where the data that is sent will reside in the remote journal receiver on the target computer system. The vector array 126 includes multiple pointer-length pairs that each identify a different portion of the journal receiver 124 to send to the target computer system. While the journal receiver 124, target map 125 and vector array 126 are shown in FIG. 1 to reside in the journal 123, they could also each be separate from journal 123. The function of the journal 123 is discussed in more detail below.

The filtered remote journal mechanism 127 includes selection criteria 128 for determining which data in the database journal 123 to send to the target computer system. The selection criteria is preferably specified by a user, and may include any suitable heuristic or method for selecting data. For example, the selection criteria 128 may be a common filter criteria on a column, such as "include all records that have a value of FullTime in the EmployeeStatus column." In addition, multiple filter criteria may also be specified. The selection criteria may also include data that is manually selected by a user in a graphical user interface, as discussed in more detail below with reference to FIG. 8. The selection criteria 128 may also be specified on metadata not present in the user data portion of a journal entry, such as the name of the program that generated the journal entry or the name of the object that was changed. The selection criteria 128 broadly includes any and all ways for a user to specify which subset of data in a database journal to send to a target computer system.

The filtered remote journal mechanism 127 generates the target map 125 to specify where data to be sent to the remote computer system will be stored. If the target computer system does not currently have a remote journal, the target map 125 will be generated to reflect the characteristics of the journal receiver on the source computer system, and the filtered remote journal mechanism 127 will send a command to the target computer system to create a remote journal with those characteristics. If the target computer system already has a remote journal, the target computer system may be queried by the filtered remote journal mechanism 127 to determine the characteristics of the remote journal receiver. The target map 125 may then be generated based on the characteristics of the remote journal receiver. The target map 125 is a virtual map of the remote journal receiver that indicates where journal entries will be stored on the target computer system.

The filtered remote journal mechanism 127 also generates the vector array 126 based on the selection criteria 128 and the target map 125 to identify a subset of the information in the database journal 123 that is less than all information in the database journal 123 to send to the target computer system. The filtered remote journal mechanism 127 may then send the vector array 126 with location information from the target map 125 to a communication manager within the network interface 150, which will cause the communication manager to send the data in the journal receiver 124 specified in the vector array 126 to the target computer system via network interface 150.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and database 129 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a filtered remote journal mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
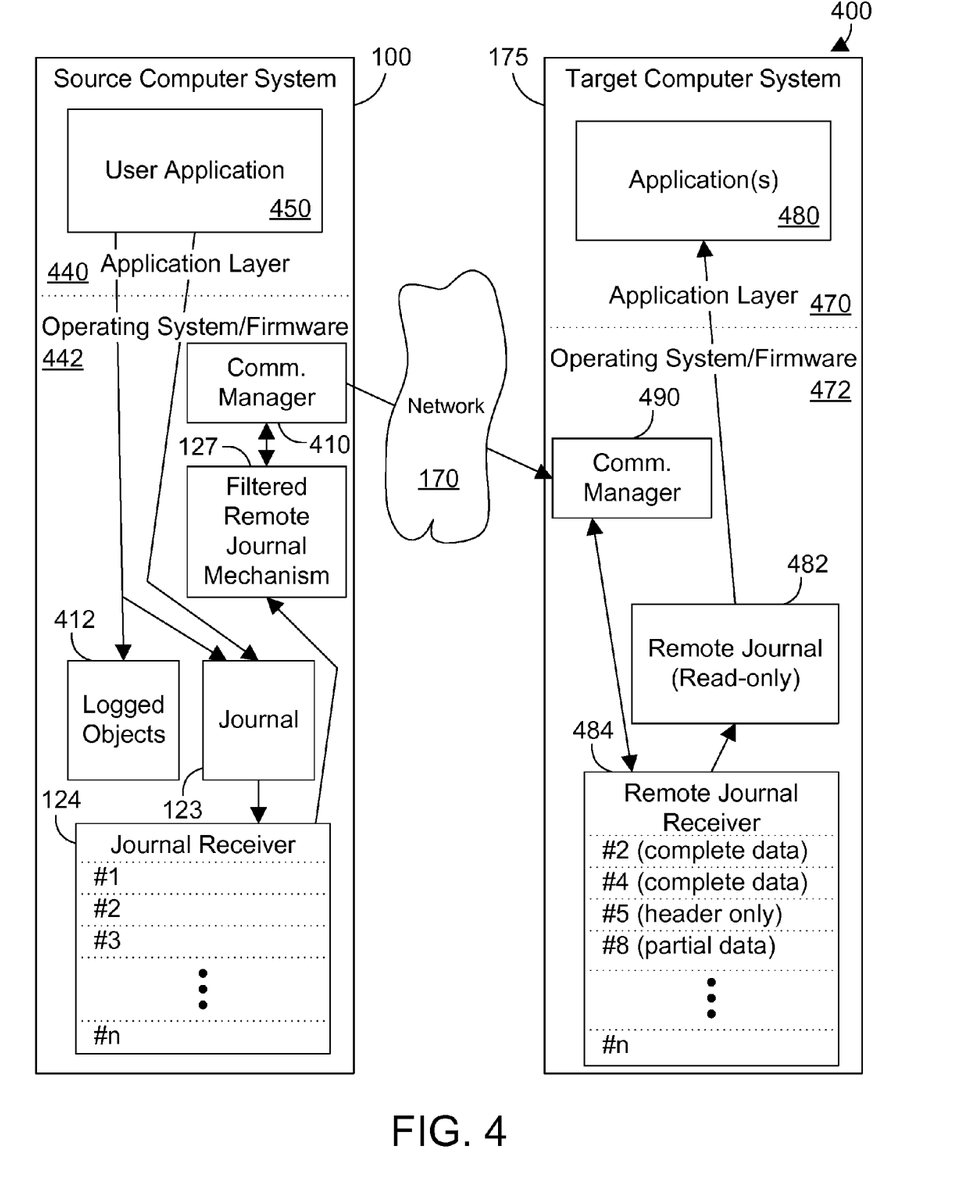
FIG. 4 is a block diagram of a system for filtered replication of journal entries between a source computer system and a target computer system according to the disclosure and claims herein.

Referring to FIG. 4, a networked computer system 400 includes a source computer system 100, which is shown in more detail in FIG. 1. The source computer system 100 includes an application layer 440 and an operating system/firmware layer 442. While the operating system 122 shown in FIG. 1 is not explicitly shown in FIG. 4, it is understood that the items in the operating system/firmware layer 442 are executed by the operating system 122 in FIG. 1 to take advantage of all the security and control features in the operating system. The application layer 440 includes one or more user applications 450. The operating system/firmware layer 442 includes a communication manager 410, the filtered remote journal mechanism 127, logged objects 412, the journal 123, and the journal receiver 124. The communication manager 410 preferably resides in the network interface 150 shown in FIG. 1, and is low-level software that provides the intelligence to communicate with other computer systems 175 via network 170 using a suitable network communication protocol, such as TCP/IP. The logged objects 412 is one suitable representation for objects in a database, such as database 129 shown in FIG. 1. When an object in a database 129 is designated a logged object 412, any change to the logged object 412 will be recorded by the journal 123 in the journal receiver 124. Note that the journal receiver 124 is shown in FIG. 1 to be part of the journal 123, while the journal receiver 124 in FIG. 4 is shown separate from the journal 123. The disclosure and claims herein expressly extend to any suitable implementation of journal and journal receiver, whether together or separate.

The filtered remote journal mechanism 127 determines which data in the journal 123 should be sent to the target computer system, and identifies that data to the communication manager 410, which sends the identified data via network 170 to the target computer system 175. The details of how this occurs are explained in detail below.

The target computer system includes an application layer 470 and operating system/firmware layer 472. The data sent from the source computer system 100 to the target computer system 175 via network 170 is received by a communication manager 490 in the operating system/firmware layer 472, and is written to the remote journal receiver 484, which is part of the remote journal 482. The communication manager 490 is preferably low-level software that implements a network protocol such as TCP/IP. The remote journal 482 is read-only from an application perspective to prevent the journal from being written to by applications 480 on the target computer system 175. The applications 480 may read data from the remote journal 482. Suitable applications that could use the data in the remote journal 482 include an object replication application, an auditing application, and various user applications. However, one skilled in the art will recognize that other applications and even other parts of the operating system may use the data in the remote journal 482.

When the remote journal receiver 484 receives the journal data from the source computer system 100 via network 170 and communication manager 490, the data is written to the remote journal receiver 484 with no gaps. The sequence numbers are maintained the same as the entries that were sent. Thus, for the example in FIG. 4, we assume the selection criteria 128 (FIG. 1) in the filtered remote journal mechanism 127 causes all of entries #2 and #4 to be selected, the header of #5 to be selected, and partial data for entry #8 to be selected. Only the selected data is sent from the source computer system 100 to the target computer system 175. The selection criteria 128 thus serves as a filter to identify a subset of information in the journal 123 that is less than all of the information in the journal 123. The remote journal 482 on the target computer system preferably packs all the received data into contiguous entries in the remote journal receiver 484. This means the remote journal receiver 484 may require much less memory than the journal receiver 124 in the source computer system 100. The packing of the data into contiguous entries in the remote journal is shown in the remote journal receiver 484 in FIG. 4.

One feature of computer system 400 is target computer system 175 may not require any special software or function to process the filtered journal data. In fact, the remote journal 482 and remote journal receiver 484 preferably function in the same way as the remote journal 282 and remote journal receiver 284 shown in FIG. 2 for the prior art configuration that performs total replication. The remote journal 482 may not know or care whether the journal entries it receives from the source computer system are filtered or not. The remote journal 482 can simply take the data it receives from the target computer system, and writes that data to the remote journal receiver 484. The data may be written sequentially, or may be written according to location information received with the data. This implementation is a vast improvement over the prior art scrape-and-send approach shown in FIG. 3, which requires special software on both source and target computer systems, and which runs in the application layer and therefore cannot take advantage of the security and control features inherent in the operating system/firmware layer. In the alternative, the target computer system 175 could include software that enhances the functionality described and claimed herein.

Figure 5:
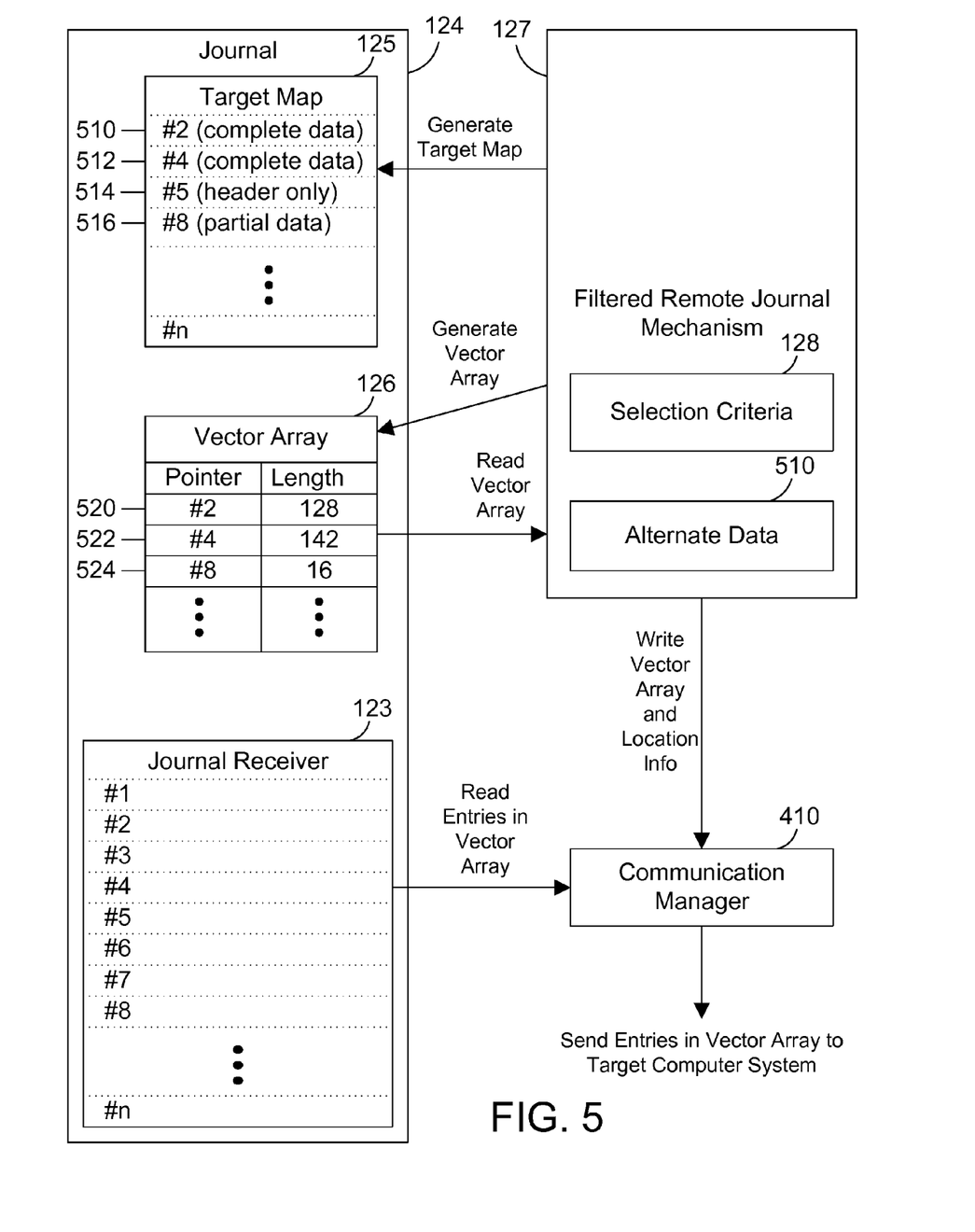
FIG. 5 is a block diagram showing additional details regarding the generation of filtered journal entries that are sent to a target computer system.

FIG. 5 shows a block diagram with additional details to illustrate the implementation in FIG. 4. The journal 124 includes target map 125, vector array 126 and journal receiver 123. The filtered remote journal mechanism 127 includes selection criteria 128 and alternate data 510. The communication manager 410 is also shown in FIG. 5. The function of the specific example in FIG. 5 may best be understood with reference to method 600 in FIG. 6. First, the filtered remote journal mechanism generates a target map of the remote journal (step 610). The target map 125 is shown in FIG. 5 to specify locations for the complete data from entry #2 at 510, the complete data from entry #4 at 512, the header from entry #5 at 514, and partial data from entry #8 at 516. The target map 125 is thus a virtual map of what will be stored in the remote journal receiver 484 in the remote computer system. The target map 125 may not be a complete map, because the target map 125 may require updating as journal entries are received on the journal receiver 123 and are sent to the target computer system. In a static case where an existing journal receiver that is not receiving new journal entries needs to be replicated on the target computer system with filtered data according to the selection criteria, the target map 125 may be generated based on the characteristics of the journal receiver 123 because the remote journal receiver 484 does not yet exist. Assuming the existing journal receiver is not receiving new journal entries, there may be no need to change the target map 125 if the target map 125 includes all the entries in the journal receiver. However, it may be more efficient to process portions of the journal receiver iteratively, which will require updating the target map with each iteration.

Journal entries include a length of the entry. When the selection criteria 128 filters information from the journal receiver, the length of a journal entry may not be the same as in the original journal entry. For example, if the selection criteria 128 filters out personal information that makes up 128 bytes of a 512 byte journal entry, the length of the journal entry on the remote journal receiver will be 384 bytes, not 512 bytes. Alternate data 510 in the filtered remote journal mechanism provides the ability to substitute any suitable data for any portion of a journal entry. Thus, the vector array could include a pointer-length pair that points to alternate data 510 so the correct length of the journal entry is written to the remote journal receive in the target computer system. This ability to substitute a different length for a journal entry also provides the ability to substitute any alternate data as needed. For example, instead of excluding personal information from a journal entry, substitute data that reads "personal info not available" could be put in place of the personal information, thereby providing an indication to a user of the remote journal entries regarding the filtered data. This substituting of alternate data using the vector array 126 is a powerful feature.

In a dynamic case where an existing journal receiver 123 is being replicated on the target computer system as the journal receiver 123 receives new journal entries, the target map may be initially generated according to characteristics of an existing remote journal receiver, or if no remote journal receiver exists, according to characteristics of the journal receiver on the source computer system. The target map 125 will then be updated each time new entries are made to the journal receiver 123 in an iterative fashion. New entries will be sent by the filtered remote journal mechanism 128 generating a new vector array 126 for the new entries, and sending the vector array 126 with location information from the target map 125 to the communication manager 410 in the network interface.

The vector array is generated according to the selection criteria 128, which is preferably specified by a user, as discussed in more detail below with reference to FIG. 8. The filtered remote journal mechanism 127 thus uses the selection criteria 128 to generate the vector array 126 in step 620 in FIG. 6. The vector array 126 is preferably a table of pointer-length pairs that specify a journal entry along with a length in bytes of data to be included. In one specific implementation, the pointer simply points to a journal entry, and the length is the number of bytes to write starting at the first byte of the journal entry. In an alternative implementation, the pointer identifies both a journal entry and an offset in bytes of where writing is to begin, with the length specifying the number of bytes to be written. The format of the vector array 126 allows contiguous data in the journal receiver 123 to be written using a single entry in the vector array. Entry 520 in the vector array 126 corresponds to entry 510 in the target map 125. Entry 522 in the vector array 126 corresponds to both entries 512 and 514 in the target map. We assume the pointer to #4 in entry 522 identifies the beginning of entry #4 in the journal receiver, and length of 142 bytes spans not only all of entry #4 but also the header of entry #5. Thus we see that a single entry in the vector array 126 may correspond to multiple entries in the journal receiver 123. This greatly simplifies the function of the vector array. If many contiguous pieces of data in journal entries need to be sent, all may be sent using a single pointer-length pair in the vector array 126. Entry 524 in the vector array 126 corresponds to entry 516 in the target map 125.

Once the filtered remote journal mechanism 127 has generated the vector array 126, the vector array is written to the communication manager 410 with location information from the target map that tells the communication manager where to store the information in the target computer system (step 630). The communication manager 410 then uses the vector array 126 to identify which portions of the journal receiver 123 to send to the target computer system, and sends that data (step 640). If no new journal entries have arrived during the execution of method 600 (step 650=NO), method 600 is done. If new journal entries arrived (step 650=YES), method 600 loops back to step 610 and repeats the process for the new journal entries. Method 600 in FIG. 6 may be a one-pass process for a journal that is not receiving new journal entries, and may make multiple iterations for a journal that is receiving new journal entries.

Figures 6, 7:
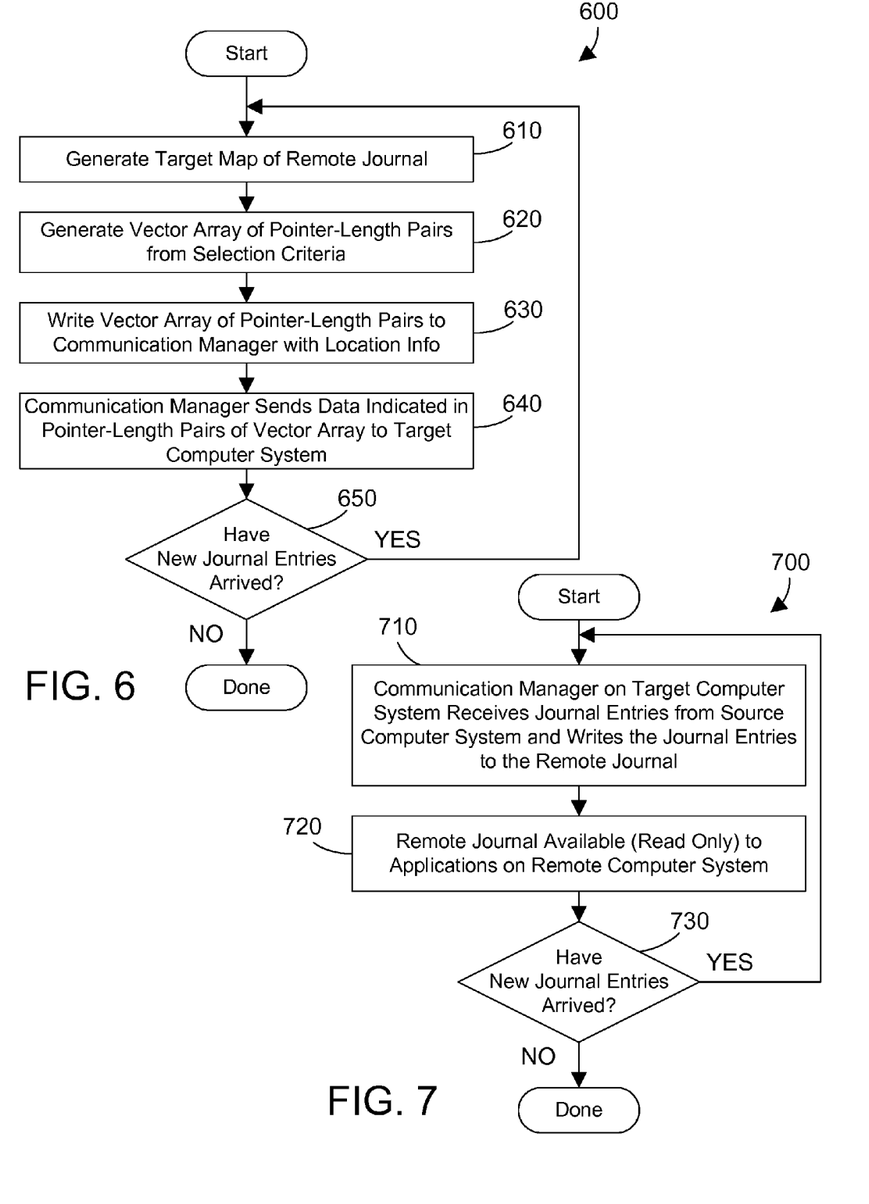
FIG. 6 is a flow diagram of steps performed on the source computer system.
FIG. 7 is a flow diagram of steps performed on the target computer system.

As stated above, the functions on the target computer system 175 in FIG. 4 are preferably the same as the functions on the target computer system 220 shown in FIG. 2 in the total replication scenario. In other words, the target computer system 175 may not know or care whether it is dealing with all journal entries or filtered journal entries. Referring to FIGS. 4, 5 and 7, the communication manager 490 on the target computer system 175 receives journal entries from the source computer system 100 and writes the journal entries to the remote journal 482 (step 710), which in turn writes the journal entries to the remote journal receiver 484. The remote journal 482 is then available on a read-only basis to applications 480 running in the application layer 470 of the target computer system 175 (step 720). If new journal entries arrived in the source computer system while method 700 is being executed (step 730=YES), method 700 loops back to step 710 and repeats the process for the new journal entries until no new journal entries have arrived (step 730=N0). At this point, method 700 is done.

Figure 8:
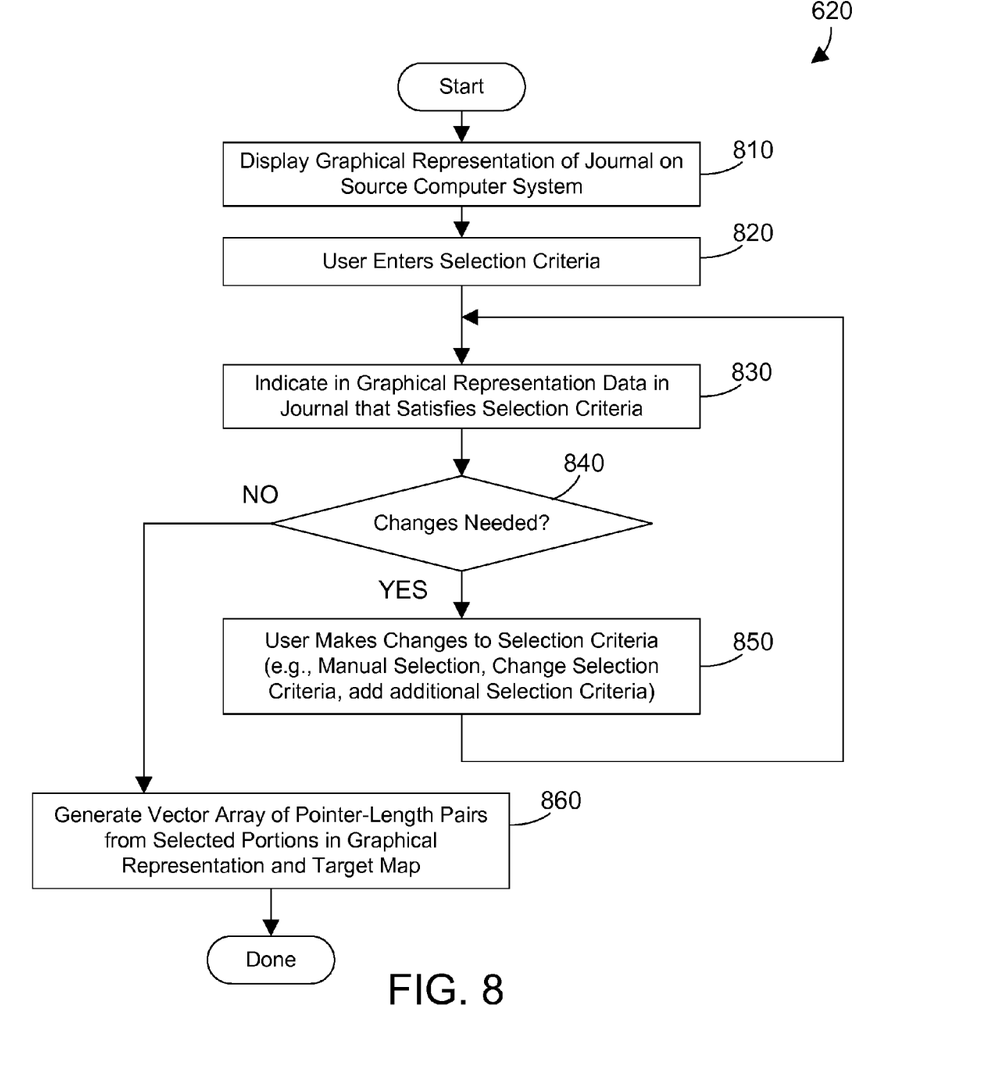
FIG. 8 is a flow diagram showing one suitable implementation of step 620 in FIG. 6 according to the disclosure and claims herein.

One specific way for the filtered remote journal mechanism to generate the vector array in step 620 in FIG. 6 is shown as method 620 in FIG. 8. A graphical representation of the journal on the source computer system is displayed (step 810). A user then enters the selection criteria (step 820). The data in the journal that satisfies the selection criteria is indicated in the graphical representation (step 830). One suitable way to indicate the selected data is to show selected data normally, and non-selected data grayed-out. In the alternative, the selected data could be distinguished from the non-selected data using different colors. Step 830 expressly extends to any suitable way to indicate in a graphical representation of a journal which data satisfies the selection criteria and which data does not.

If no changes are needed (step 840=NO), the vector array of pointer-length pairs is generated from the selected portions in the graphical representation and the target map (step 860), and method 620 is done. If changes are needed (step 840=YES), the user may make suitable changes to the selection criteria (step 850). Suitable changes include manually selecting data in the graphical representation, changing the selection criteria, and adding additional selection criteria. Once the user makes the changes to the selection criteria in step 850, the changes are displayed in step 830. Once no more changes are needed (step 840=NO), the vector array of pointer-length pairs is generated from the selected portions in the graphical representation and the target map (step 860), and method 620 is done.

Filtering journal data allows replicating a portion of a database on a remote target computer system while excluding some of the data in the database. For example, let's assume a research hospital has a large database with a vast amount of information related to its patients. We assume the research hospital wants to provide certain medical records for some of its patients for the purpose of statistical analysis, but does not want to disclose the patient's identity. A user could specify a selection criteria that includes all cancer patients and excludes all personal information. The filtered remote journal mechanism would then generate a vector array based this selection criteria and based on the target map. The filtered remote journal mechanism would then send the vector array to the communication manager, which sends the data identified in the vector array to the target computer system. On the target computer system, the data sent from the source computer system is written to the remote journal, and a database that includes only the selected data may then be created on the target computer system using the remote journal. This simple example illustrates the power and flexibility provided by the filtered remote journal mechanism disclosed and claimed herein.

The vector array disclosed herein may also be used to filter objects other than journal entries for both preexisting data as well as data as it arrives real-time. For example, a vector array could filter records from a database file using file transfer protocol (FTP). In similar fashion, a vector array could be used to filter stream data. For example, we assume an audio file contains objectionable language. Algorithms already exist to identify words in audio streams, so a list of objectionable language could be used as selection criteria (i.e., select all words that are not objectionable). A vector array could then be constructed that includes all words in the audio stream that are not objectionable, and that filters the objectionable words from the audio stream. In the alternative, a beep of a suitable duration could replace the objectionable language in the audio stream.

The discussion herein is in terms of a journal and journal receiver. These are terms commonly used in DB2/400 parlance to describe how logging of database changes occurs. Other database systems may use different terminology. For example, a journal herein may be called a log, and the journal receiver may be called a log member. The specific labels used herein are used by way of example. The disclosure and claims expressly extend to any suitable mechanism for recording changes to a database in multiple entries, where each entry identifies one or more changes to the database.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The filtered remote journal mechanism in an operating system generates a target map that determines where journal entries are stored on a target computer system, allows a user to specify selection criteria, and generates a vector array of pointer-length pairs based on the selection criteria and the target map. The vector array and location information from the target map may then be written to a communication manager, which can transmit the selected data to the target computer system. In this manner filtering of journal data is achieved with all the security and controls provided within the operating system in a manner that may be transparent to the target computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A first computer system comprising:
   at least one processor;
   a memory coupled to the at least one processor;
   an operating system residing in the memory and executed by the at least one processor, the operating system comprising:
   a first database journal that includes a plurality of journal entries that each represent a change made to a database;
   a filtered remote journal mechanism that generates a target map in the first computer system of a second database journal on a second computer system to define locations of a plurality of entries in the second database journal, the filtered remote journal mechanism generating from at least one selection criteria a vector array that identifies a subset of the information in the first database journal that is less than all information in the first database journal, wherein the vector array comprises a plurality of pointer-length pairs, each pointer pointing to one of the plurality of journal entries in the first database journal, and each length specifying how much data to send to the second computer system; and
   a communication manager that manages communication between the first computer system and the second computer system coupled via a network to the first computer system, wherein the communication manager receives from the filtered remote journal mechanism the vector array and location information from the target map, and in response, transmits the subset of information specified in the vector array from the first database journal to the second computer system.

2. The first computer system of claim 1 wherein the at least one selection criteria is specified by a user in a graphical representation of the first database journal.

3. The first computer system of claim 1 wherein one of the plurality of pointer-length pairs specifies data in a plurality of journal entries in the first database journal to send to the second computer system.

4. The first computer system of claim 1 wherein one of the plurality of pointer-length pairs specifies alternate data to replace filtered data in one of the plurality of journal entries in the first database journal.

5. The first computer system of claim 1 wherein the first database journal does not receive new journal entries, and the filtered remote journal mechanism is used to process all journal entries in the first database journal to generate the vector array.

6. The first computer system of claim 1 wherein the first database journal receives new journal entries, and the filtered remote journal mechanism is used to process a group of the new journal entries in the first database journal to generate the vector array and to update the target map to indicate location for the group of new journal entries.

7. A computer-implemented method for sending database journal information from a first computer system to a second computer system by an operating system in the first computer system, the operating system performing the steps of:
   (A) generating a target map in the first computer system of a second database journal on the second computer system to define locations of a plurality of entries in the second database journal;
   (B) generating from at least one selection criteria a vector array that identifies a subset of information in a first database journal in the first computer system that is less than all information in the first database journal, wherein the vector array comprises a plurality of pointer-length pairs, each pointer pointing to one of the plurality of journal entries in the first database journal, and each length specifying how much data to send to the second computer system;
   (C) writing the vector array and location information from the target map to a communication manager in the operating system that manages communication between the first computer system and a second computer system coupled via a network to the first computer system; and (D) the communication manager transmitting the subset of information specified in the vector array from the first database journal to the second computer system.

8. The method of claim 7 further comprising the step of a user specifying the at least one selection criteria in a graphical representation of the first database journal.

9. The method of claim 7 wherein one of the plurality of pointer-length pairs specifies data in a plurality of journal entries in the first database journal to send to the second computer system.

10. The method of claim 7 wherein one of the plurality of pointer-length pairs specifies alternate data to replace filtered data in one of the plurality of journal entries in the first database journal.

11. The method of claim 7 further comprising the steps of:
the first database journal not receiving new journal entries; and
processing all entries in the first database journal to generate the vector array.

12. The method of claim 7 further comprising the steps of:
the first database journal receiving new journal entries;
processing a group of new journal entries in the first database journal to generate the vector array; and
updating the target map to indicate the location for the group of new journal entries.

13. A computer-implemented method for an operating system to send database journal information from a first computer system to a second computer system, the method comprising the steps of:

(A) generating a target map in the first computer system of a second database journal on the second computer system to define locations of a plurality of entries in the second database journal;

(B) displaying a graphical representation of a first database journal on the first computer system to a user;

(C) the user entering at least one selection criteria for filtering information in the first database journal, the at least one selection criteria being selected from the group consisting of:
  (C1) manually selecting information in the first database journal;
  (C2) changing the at least one selection criteria; and
  (C3) adding additional selection criteria;

(D) indicating in the displayed graphical representation data in the first database journal that satisfies the at least one selection criteria;

(E) generating a vector array that identifies a subset of the information in the first database journal that is less than all information in the first database journal based on the at least one selection criteria, wherein the vector array comprises a plurality of pointer-length pairs, each pointer pointing to one of the plurality of journal entries in the first database journal, and each length specifying how much data to send to the second computer system;

(C) writing the vector array and location information from the target map to a communication manager in the operating system that manages communication between the first computer system and a second computer system coupled via a network to the first computer system; and (D) the communication manager transmitting information from the first database journal specified in the vector array to the second computer system.

14. An article of manufacture comprising an operating system stored on non-transitory recordable media, the operating system comprising:
a first database journal that includes a plurality of journal entries that each represent a change made to a database;
a filtered remote journal mechanism that generates a target map of a second database journal to define locations of a plurality of entries in the second database journal, the filtered remote journal mechanism generating from at least one selection criteria a vector array that identifies a subset of the information that is less than all information in the first database journal, wherein the vector array comprises a plurality of pointer-length pairs, each pointer pointing to one of the plurality of journal entries in the first database journal, and each length specifying how much data to send to the second computer system; and
a communication manager that manages communication between a first computer system and a second computer system coupled via a network to the first computer system, wherein the communication manager receives from the filtered remote journal mechanism the vector array and location information from the target map, and in response, transmits the subset of information specified in the vector array from the first database journal to the second computer system.

15. The article of manufacture of claim 14 wherein the at least one selection criteria is specified by a user in a graphical representation of the first database journal.

16. The article of manufacture of claim 14 wherein one of the plurality of pointer-length pairs specifies data in a plurality of journal entries in the first database journal to send to the second computer system.

17. The article of manufacture of claim 14 wherein one of the plurality of pointer-length pairs specifies alternate data to replace filtered data in one of the plurality of journal entries in the first database journal.

18. The article of manufacture of claim 14 wherein the first database journal does not receive new journal entries, and the filtered remote journal mechanism is used to process all entries in the first database journal to generate the vector array.

19. The article of manufacture of claim 14 wherein the first database journal receives new journal entries, and the filtered remote journal mechanism is used to process a group of new entries in the first database journal to generate the vector array and to update the target map to indicate the location for the group of new journal entries.

* * * * *